(12) United States Patent
Chang

(10) Patent No.: US 6,338,592 B1
(45) Date of Patent: Jan. 15, 2002

(54) ARTICLE CONNECTOR

(76) Inventor: James C Chang, PO Box 82-144, Taipei (TW)

( * ) Notice: Subject to any disclaimer, the term of this patent is extended or adjusted under 35 U.S.C. 154(b) by 0 days.

(21) Appl. No.: 09/484,592

(22) Filed: Jan. 18, 2000

(51) Int. Cl.[7] .............................. B25G 3/38; A61H 3/00
(52) U.S. Cl. ....................... 403/345; 403/187; 403/233; 403/403; 135/67; 135/74
(58) Field of Search ................... 403/187, 205, 403/192, 233, 234, 403, 96; 256/26, 67; 135/67, 74

(56) References Cited

U.S. PATENT DOCUMENTS

| | | | |
|---|---|---|---|
| 895,297 A | * | 8/1908 | Peter ....................... 403/192 X |
| 3,144,946 A | * | 8/1964 | Ellis ........................ 403/192 X |
| 5,188,139 A | * | 2/1993 | Garelick ........................ 134/67 |

* cited by examiner

Primary Examiner—Lynne H. Browne
Assistant Examiner—Ernest Garcia
(74) Attorney, Agent, or Firm—A & J

(57) ABSTRACT

An article connector including an insertion seat having an insertion hole, an opening and a plurality of installation holes; an connection seat mounted with a mounting shaft to combine with the opening of the insertion seat, and having an engaging slot; and two shaft bodies, one of the shaft bodies being provided with a plurality of screw holes, and the engaging slot being engaged with a mounting hole provided at one side of the shaft bodies, thereby the two shaft bodies are formed into a structure by the insertion seat and the connection seat. The two shaft bodies require no screw or does not require a welding process to form into a connector. Thus, these parts can be dismantled and assembled rapidly, and stored in a limited storage space.

1 Claim, 8 Drawing Sheets

ARTICLE CONNECTOR

BACKGROUND OF THE INVENTION a) Technical Field of the Invention

The present invention relates to an article connector, and in particular, to a connector which allows rapid installation, provides safety and saves storage space to users.

b) Description of the Prior Art

When two tubes are to be connected to each other, generally, a plurality of screw holes are made on the surface of the tubes and a plurality of screws are used to mount the two tubes together, or the two tubes are welded together as one unit. These methods are normally employed to connect the legs of a table, or in the connection of legs of a chair, or in the connection of storage framework, etc. These methods of connection, in actual practice, have the following drawbacks:

1) The purpose of connection by screws is aimed at the convenience of dismantling when needed. However, in the method of connection by screws, a screw driver is required in order to dismantle the connection. Therefore it is laborious and time-consuming to disconnect the connected parts.

2) If the connection is done by welding, these parts cannot be disconnected and a larger space is needed for either transportation or storage.

SUMMARY OF THE INVENTION

Accordingly, it is an object of the present invention to provide an article connector which can overcome the above drawbacks.

An aspect of the present invention is to provide an article connector comprising an insertion seat having an insertion hole, an opening and a plurality of installation holes; an connection seat mounted with a mounting shaft, to combine with the opening of the insertion seat, and having an engaging slot; and two shaft bodies, one of the shaft bodies being provided with a plurality of screw holes, and the engaging slot engaged with a mounting hole provided at one side of the shaft bodies, thereby the two shaft bodies are formed into a structure by the insertion seat and a connection seat.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
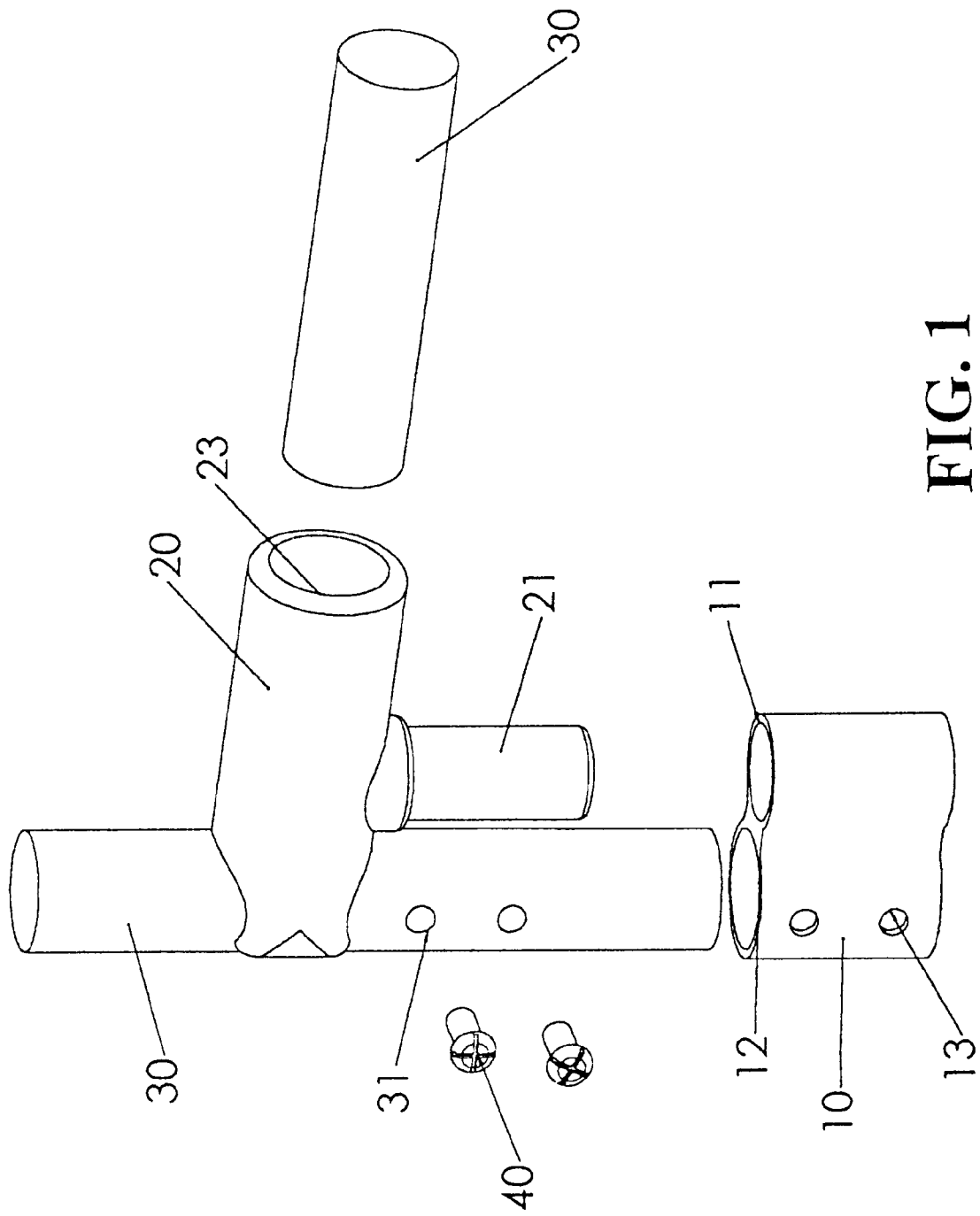
FIG. 1 is a perspective exploded view of the article connector in accordance with the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
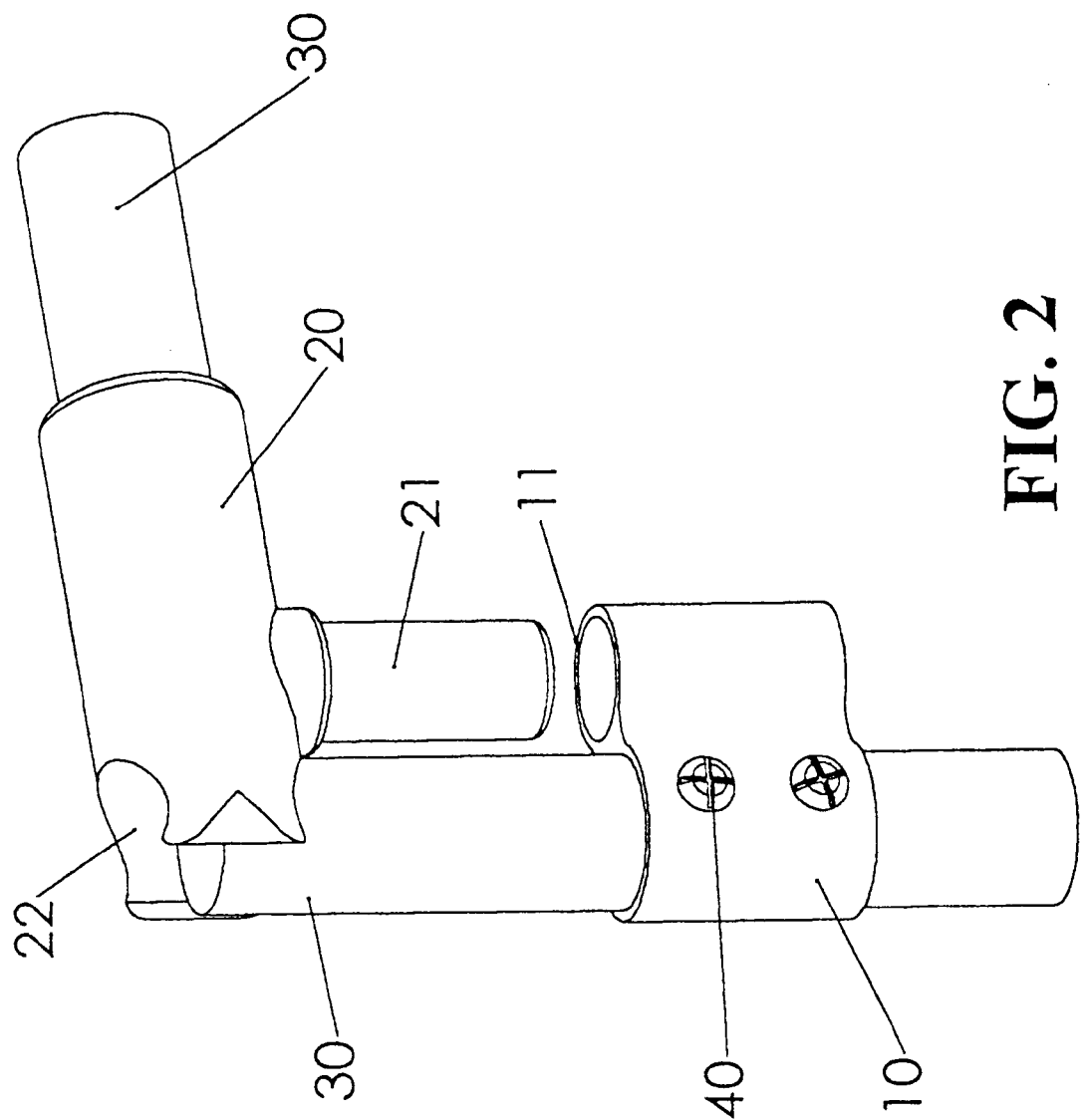
FIG. 2 is a perspective view of the article connector in accordance with the present invention.
Figure 3:
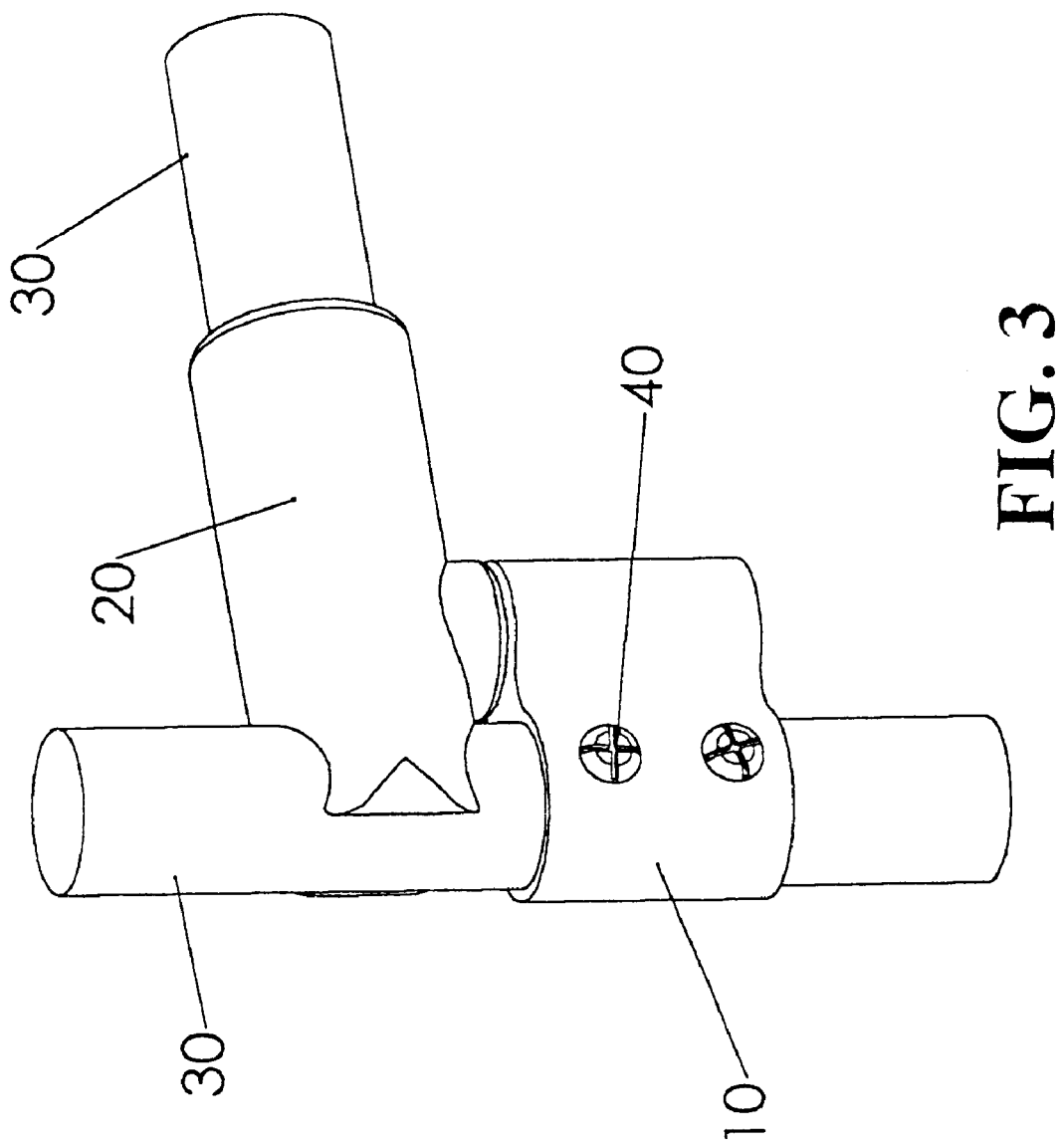
FIG. 3 is another perspective view of the article connector in accordance with the present invention.

Referring to FIGS. 1, 2 and 3, there is shown an article connector comprising (a) an insertion seat 10 having an insertion hole 12, an opening 11 and a plurality of installation holes 13; (b) an connection seat 20 having a downwardly extending mounting shaft 21 adapted to engage with the opening 11 of the insertion seat 10, and having an engaging slot 22 at an end and a mounting hole 23 at the other; and (c) two shaft bodies 30, one of the shaft bodies 30 being fitted into the mounting hole 23, and the other one of the shaft bodies 30 is inserted into the engaging slot 22 and formed with a plurality of screw holes 31.

In combination, the insertion hole 12 of the insertion seat 10 is inserted with the shaft body 30, and the installation holes 13 are aligned with the screw holes 31 of the shaft body 30. A plurality of screws 40 are used to fasten the insertion seat 10 onto the shaft body 30. Then, the mounting shaft 21 of the connection seat 20 is inserted into the opening 11 at the insertion seat 10. At this instance, the engaging slot 22 of the connection seat 20 is aligned with the shaft body 30. The mounting shaft 21 of the connection seat 20 is inserted into the opening 11 of the insertion seat 10. Then, another second shaft body 30 is inserted into the mounting hole 23 of the connection seat 20. Thus, the combination of two shaft bodies 30 is completed and is shown in FIG. 3.

In application, the mounting of the insertion seat 10 to the shaft body 30 is done in the manufacturing plant as a unit. Thus, the insertion seat 10, the connection seat 20 and the other shaft body 30 are packed as three separate items. Accordingly, in the process of transportation and storage keeping of these items, only a limited space is needed. In combination of these items, no auxiliary tools are required, but they form into a strong and tough structure.

In accordance with the present invention, the depth of the mounting hole 23 of the connection seat 20 exceeds the position of the center axis of the mounting shaft 21. Thus, when the shaft body 30 is inserted into the mounting hole 23 at the connection seat 20, a stable structure is obtained. When a heavy weight is applied onto the shaft body 30, the force exerted onto the entire structure passes to the shaft center of the mounting shaft 21 of the connection seat 20 and is cancelled by the insertion seat 21. Thus, the entire structure can withstand a greater force.

Figure 4:
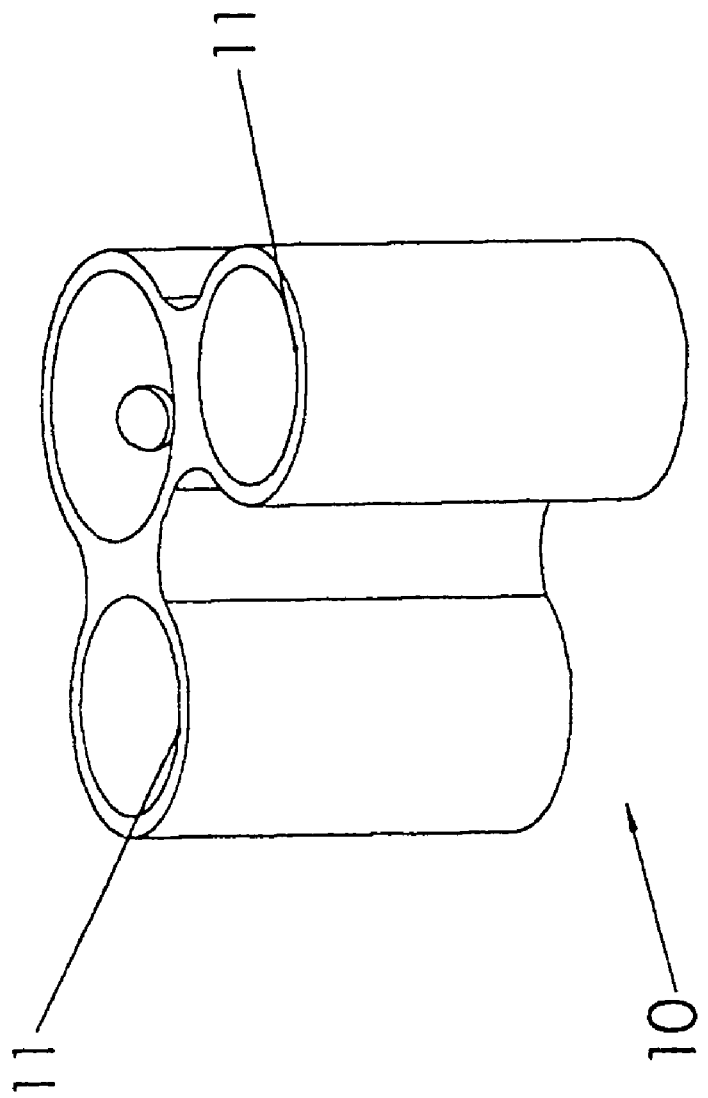
FIG. 4 is a perspective view of an insertion seat of another preferred embodiment in accordance with the present invention.
Figure 5:
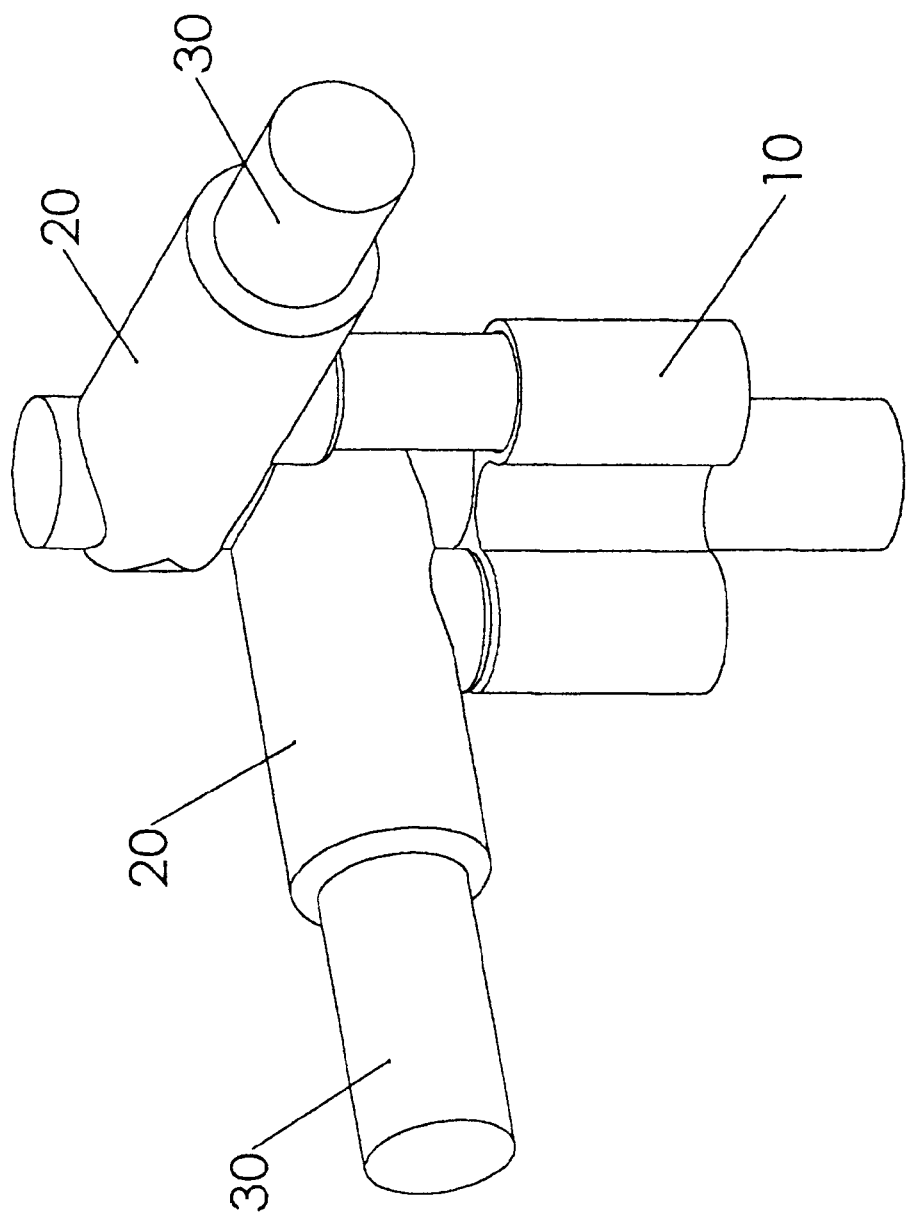
FIGS. 5 to 7 are perspective views of other preferred embodiments in accordance with the present invention.
Figure 6:
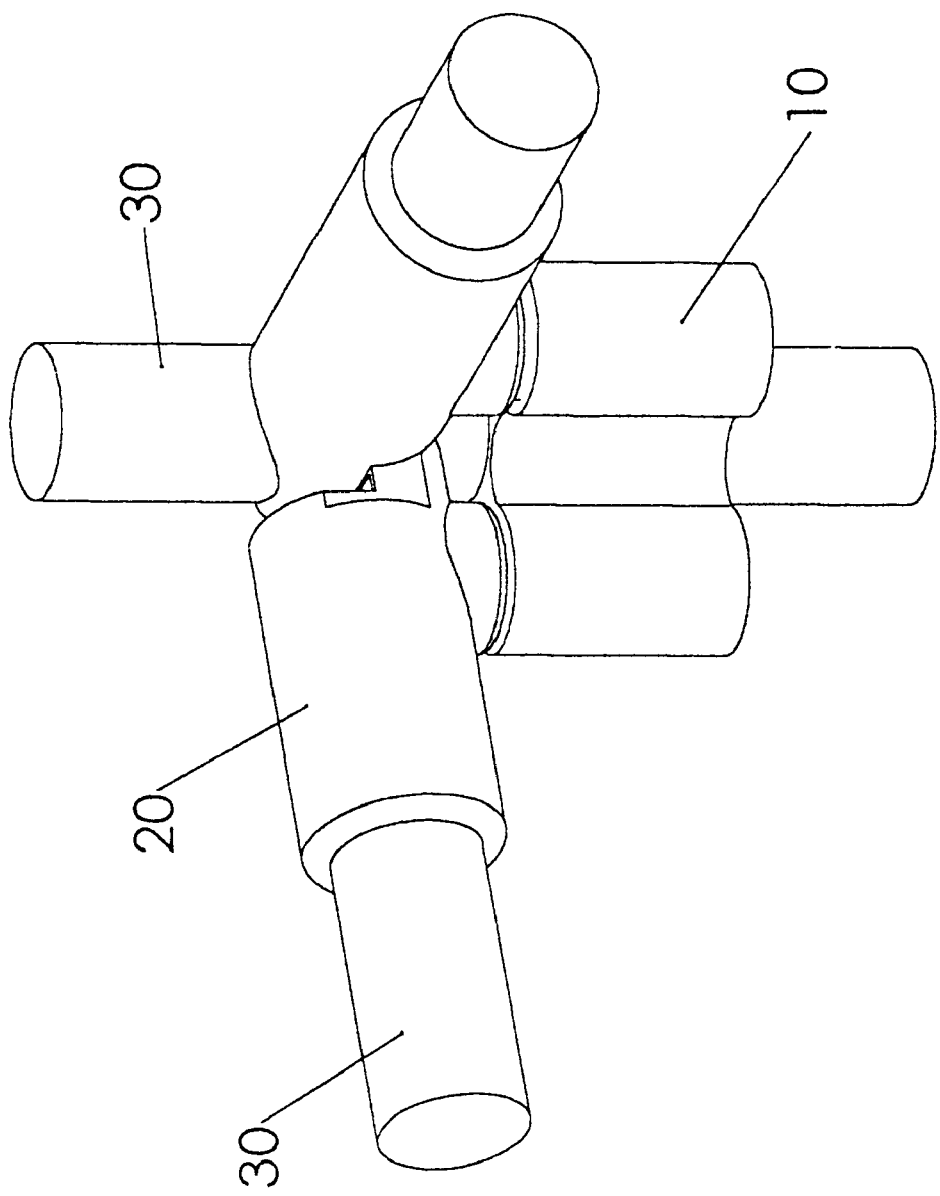

FIG. 4 shows another preferred embodiment in accordance with the present invention. As shown in FIG. 4, the insertion seat 10 is provided with more than two openings 11. The openings 11 of the insertion seat 10 are spaced to form an angle of 90 degree or other angle with respect to the insertion seat 10. Thus, in combination, it provides a dual directional structure as that shown in FIG. 5. If the vertical height of the wall defining the engaging slot 22 of the connection seat 20 is reduced, a structure having a move stable function is obtained and is shown in FIG. 6.

Figure 7:
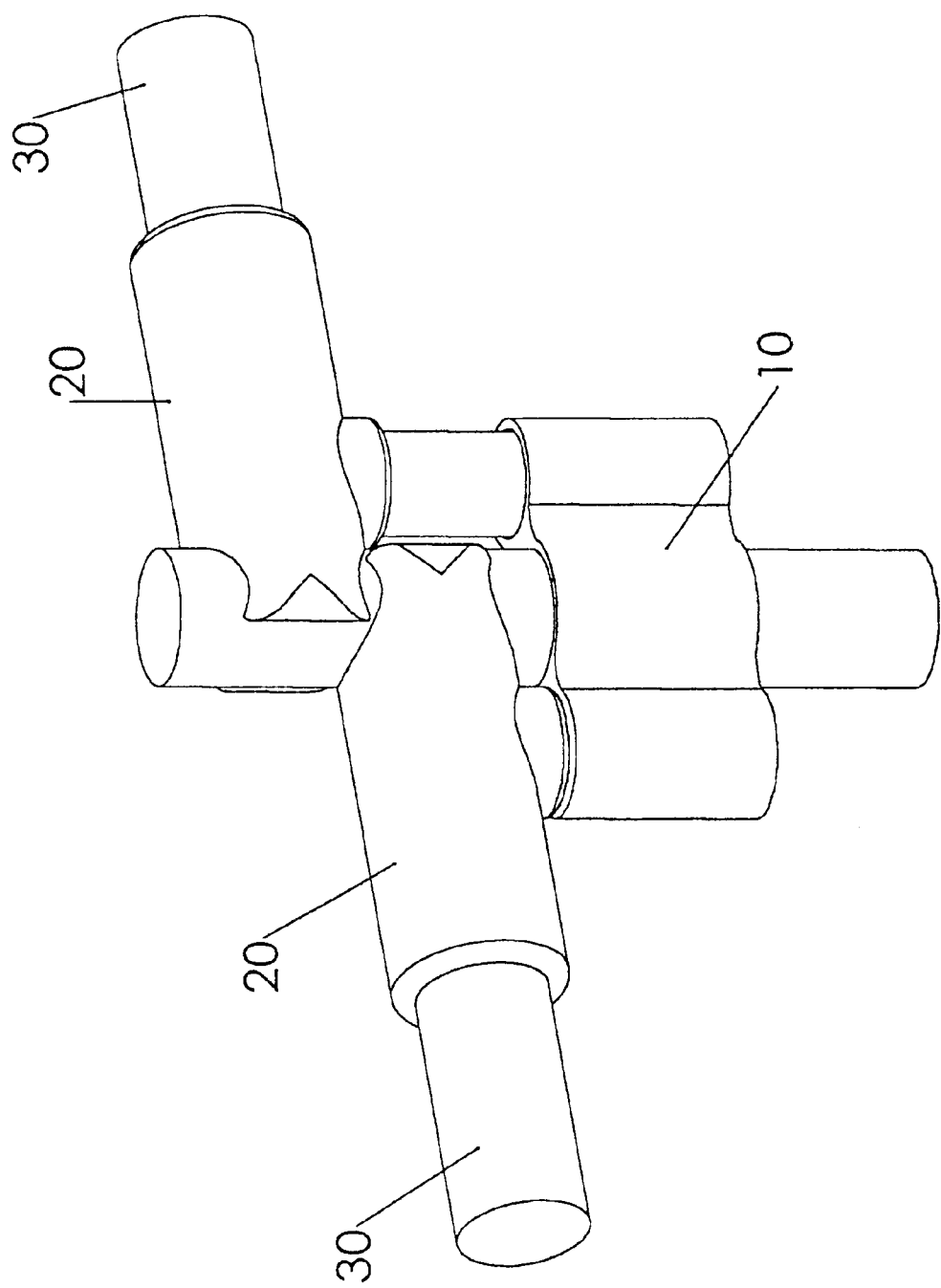
Figure 8:
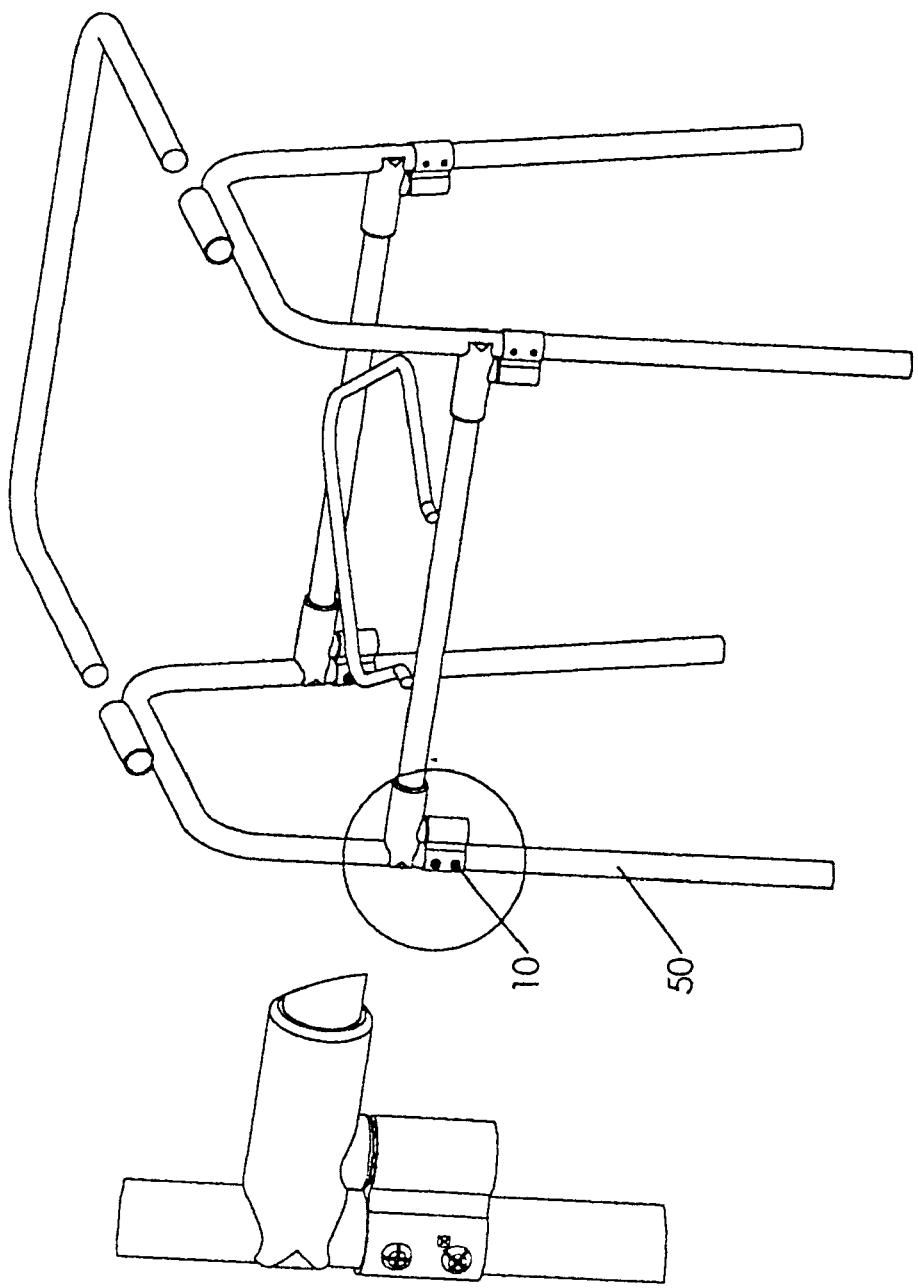
FIG. 8 is a schematic view illustrating the application of the article connector in medical bed structure.

FIG. 7 is another preferred embodiment in accordance with the present invention. As shown in the figure, the openings 11 of the insertion seat 10 are spaced into 180 degree apart. That is, a planar structure is formed.

In accordance with the present invention, the shape of the opening 11 and that of the mounting shaft 21 can be made into polygonal shape structure. This also provides a similar effective function as that of the above-mentioned preferred embodiment. When the shaft body 30 has a polygonal shape, the mounting hole 23 and the insertion hole 12 have a similar cross-sectional shape. They provide a similar function as that mentioned in the earlier preferred embodiments.

In accordance with the present invention, the shaft body 30 can be hollow, and the method of combination of the shaft body 30 with the insertion seat 10 is either by using rivets or by other method of mounting. The structure also provides a similar function.

The present connector can be used to combine general frame bodies, such as the legs of a table, or frame for holding goods, or medical bed. If the connector of the present invention is to be used in connection frame bodies so as to withstand a larger load, the vertical height of the insertion seat 10 is increased such that more installation holes 13 can be made thereon to provide further support to the shaft body 30, and the length of the mounting shaft 21 and the connection seat 20 are increased such that the mounting hole 23 of the connection seat 20 has a greater depth to insert the other shaft body 30. Accordingly, this combined structure can withstand a larger force of exertion.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

I claim:

1. An article connection comprising:

an insertion seat having an insertion hole, an opening and a plurality of installation holes;

a connection seat having a downwardly extending mounting shaft adapted to engage with said opening of said insertion seat, and having an end formed with an engaging slot and another end formed with a mounting hole, said mounting hole having a depth going through a center axis of said mounting shaft; and two shaft bodies, one of said shaft bodies being fitted into said hole of said connection seat, another one of said shaft bodies being inserted into said engaging slot of said connection seat and formed with a plurality of screw holes, said another one of said shaft bodies being fixedly connected with said insertion seat by rivets extending through said screw holes of said another one of said shaft bodies and said installation holes of said insertion seat.

* * * * *